United States Patent
Kubota

(10) Patent No.: US 6,484,775 B2
(45) Date of Patent: Nov. 26, 2002

(54) IC-CARD MANUFACTURING APPARATUS

(75) Inventor: Suinobu Kubota, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 49 days.

(21) Appl. No.: 09/749,392

(22) Filed: Dec. 28, 2000

(65) Prior Publication Data

US 2001/0005603 A1 Jun. 28, 2001

(30) Foreign Application Priority Data

Dec. 28, 1999 (JP) .......................... 11-374123
Dec. 28, 1999 (JP) .......................... 11-374124
Dec. 28, 1999 (JP) .......................... 11-374125

(51) Int. Cl.$^7$ ............................. B32B 31/20
(52) U.S. Cl. .................. 156/358; 156/367; 156/382; 156/583.8; 156/583.9; 156/583.2; 156/378
(58) Field of Search ................ 156/356, 358, 156/359, 367, 378, 381, 382, 580, 583.1, 583.2, 583.8, 583.9, 583.6, 228, 497; 100/301, 308, 315, 316, 319, 324, 322; 72/290, 295, 296, 350; 269/47, 96, 293

(56) References Cited

U.S. PATENT DOCUMENTS

| 4,080,243 A | * | 3/1978 | Pohl ........................... 156/580 |
| 5,147,496 A | * | 9/1992 | Hix ........................... 156/583.8 |
| 5,635,014 A | * | 6/1997 | Taylor ........................ 156/358 |
| 5,679,197 A | * | 10/1997 | Haupt et al. ................. 156/212 |

FOREIGN PATENT DOCUMENTS

| JP | 154173 | 11/1989 |
| JP | 216234 | 4/1990 |
| JP | 426299 | 5/1992 |
| JP | 6176214 | 6/1994 |
| JP | 9277766 | 10/1997 |
| JP | 1148660 | 2/1999 |
| JP | 182014 | 6/2000 |
| JP | 2000182014 | 6/2000 |

* cited by examiner

Primary Examiner—Richard Crispino
Assistant Examiner—George R. Koch, III
(74) Attorney, Agent, or Firm—Birch, Stewart, Kolasch and Birch, LLP

(57) ABSTRACT

An IC-card manufacturing apparatus includes paired press platens and a laminated-substrate sandwiching unit. Each of the press platens has a pressure-application surface. The laminated-substrate sandwiching unit includes upper and lower sandwiching members for sandwiching a laminated substrate in a sealed state. Each of the upper and lower sandwiching members has a plate portion equal in size and shape with the corresponding pressure-application surface or projecting outward from the pressure-application surface by a predetermined amount, a frame portion bigger than the plate portion, and a connection portion which connects the plate portion and the frame portion and absorbs thermal deformation of the plate portion. The IC-card manufacturing apparatus further includes an air supply unit for supplying air to air passages having air jetting openings formed on the pressure-application surfaces of the press platens, and a control unit for controlling the air supply unit so as to supply air to the air passages for a preset period of time when the paired press platens are opened. A plurality of air cushion units are disposed between a press-platen main body and a press-platen base to be located at different positions, and a pressure setting unit for independently controlling the respective pressures of the air cushion units is provided.

11 Claims, 11 Drawing Sheets

IC-CARD MANUFACTURING APPARATUS

BACKGROUND OF THE INVENTION

1. Field of the Invention

The present invention relates to an IC-card manufacturing apparatus suitable for manufacture of thin, non-contact-type IC cards.

2. Description of the Related Art

IC cards containing electronic components such as IC chips are generally known. Such an IC card must be manufactured such that the card has no uneven surface which would otherwise result due to accommodation of an electronic component therein. Therefore, methods and apparatuses for manufacturing such an IC card have been proposed in Japanese Patent Publication No. 2(1990)-16234 and in Japanese Patent Application Laid-Open Nos. 6(1994)-176214, 9(1997)-277766, and 11(1999)-48660.

Meanwhile, a thin, flexible, non-contact-type IC card having a thickness of a few hundreds of micrometers has recently been put in practical use. FIG. 17 shows a typical IC-card manufacturing apparatus 100 for manufacturing such a thin, non-contact-type IC card. The IC-card manufacturing apparatus 100 includes a lower press platen 101 and an upper press platen 102. The lower press platen 101 is attached to a base 104 via a heat-insulating plate 103, and the upper press platen 102 is attached to an elevation member 106 via a heat-insulating plate 105. Thus, the lower press platen 101 serves as a stationary platen, and the upper press platen 102 serves as a movable platen. Heaters 107 and coolant passages 108 are provided within the lower press platen 101, and heaters 109 and coolant passages 110 are provided within the upper press platen 102. Further, a tubular lower chamber member 111 is provided on the base 104 in order to cover the circumference of the lower press platen 101, and an upper chamber member 112 is provided on the elevation member 106 in order to cover the circumference of the upper press platen 102. When the upper press platen 102 is lowered, the lower chamber member 111 and the upper chamber member 112 mate to thereby form a sealed chamber 113. Reference numeral 114 denotes an evacuation port provided on the upper chamber member 112. An unillustrated evacuator (e.g., a vacuum pump) is connected to the evacuation port 114 in order to enable evacuation of air from the chamber 113. Reference numeral 115 denotes a seal member provided on the upper chamber 112.

In such an IC-card manufacturing apparatus 100, a laminated substrate M used for fabrication of an IC card is placed on the lower press platen 101. The laminated substrate M is configured as shown in FIG. 16. Reference character P denotes an electronic component which is composed of an IC chip Pi and an antenna Pa and is mounted on a base sheet S. The base sheet S and the electronic component P are sandwiched by hot-melt sheets Ta and Tb, which are in turn sandwiched by thermoplastic resin sheets (sheets of, for example, polyethylene terephthalate) La and Lb, which carry adhesive layers Ba and Bb, respectively. Subsequently, the laminated substrate M is subjected to thermocompression bonding. Specifically, after the elevation member 106 shown in FIG. 17 is lowered, air is evacuated from the chamber 113, and the laminated substrate M is pressed by means of the lower press platen 101 and the upper press platen 102, which have been heated through supply of electricity to the heaters 107 and 109. Thus, the laminated substrate M undergoes thermocompression bonding in a state in which air bubbles have been removed from the interior of the laminated substrate M. Subsequently, the supply of electricity to the heaters 107 and 109 is stopped, and cooling water is supplied to the coolant passages 108 and 110, whereby the laminated substrate M is cooled.

Incidentally, when a thin, flexible IC card is manufactured, the states of heating and pressure-application during thermocompression bonding of the laminated substrate M greatly affect production quality. For example, when heating control is not performed properly, a manufactured product loses its flatness due to generation of warpage or distortion, and when pressure control is not performed properly, problems such as layer shifting and partial delamination occur easily, resulting in deterioration and variation in quality and decreased commercial value.

In view of the forgoing, the above-described conventional IC-card manufacturing apparatus 100 is designed such that each of the lower press platen 101 and the upper press platen 102 performs the heating step and the cooling step to thereby, secure continuity in heating control and pressure control. However, since a longer production cycle time is needed to complete fabrication of the laminated substrate M, productivity and mass-production efficiency are low, and increased energy consumption makes energy conservation and economy difficult to achieve.

The above-described problems can be solved through employment of a system in which the heating step and the cooling step are performed at different stages (locations). However, in this case, when the laminated substrate M is transferred from the stage for the heating step to the stage for the cooling step, heating and pressure application are cancelled, resulting in deterioration and variation in quality and decreased commercial value.

In view of the foregoing, the assignee of the present invention has proposed an IC-card manufacturing apparatus (basic apparatus) which comprises a laminated-substrate sandwiching unit including upper and lower sandwiching members for sandwiching a laminated substrate M in a sealed state; an evacuation unit for evacuating air from the interior of the laminated-substrate sandwiching unit; a preheating press unit for elevating the temperature of the evacuated laminated-substrate sandwiching unit—which holds the laminated substrate M—to a pre-heating temperature lower than a regular heating temperature; a thermocompression-bonding press unit for receiving the laminated-substrate sandwiching unit transferred from the pre-heating press unit and for heating the laminated-substrate sandwiching unit to the regular heating temperature to thereby effect thermocompression bonding; and a cooling press unit for receiving the laminated-substrate sandwiching unit transferred from the thermocompression-bonding press unit and for cooling the laminated-substrate sandwiching unit (Japanese Patent Application Laid-Open No. 2000-182014).

Since this basic apparatus is equipped with a laminated-substrate sandwiching unit, the laminated substrate M can be accommodated within the evacuated laminated-substrate sandwiching unit in a sealed state, so that the heated state and the pressurized state can be maintained continuously; i.e., the temperature and pressure of the laminated substrate M can be maintained. As a result, commercial value can be increased greatly by means of improved quality,and homogeneity.

Incidentally, the laminated-substrate sandwiching unit provided in the above-described basic apparatus has upper and lower sandwiching members each consisting of a frame portion and a plate portion. The plate portion projects outward from the pressure-application surface of the press platen, and its circumferential edge portion is fixed to the frame portion. Therefore, the frame portion and a peripheral portion of the plate portion located outside the press platen are not heated, even if the interior portion of the plate portion in direct contact with the press platen is heated to high temperature, so that the plate portion assumes a shape of a wok (a convex shape) due to the difference in thermal expansion between the central and peripheral portions of the plate portion.

In this case, when the plate portion is thin, the deformation of the plate portion is suppressed by means of pressure applied from the press platen. However, when the thickness of the plate portion is 1 mm or greater, the plate portion deforms even in a state of pressure being applied from the press platen. Although the amount of deformation is relatively small, the deformation makes it impossible to press the laminated substrate M into a precise thickness or to effect pressing itself, when the laminated substrate M has a thickness of a few hundreds of micrometers. Further, when pressure applied to the plate portion is removed, the laminated substrate M (IC card) separates from the plate portion, causing: a variation in cooling speed with resultant variation in glossiness and/or generation of wrinkles. As described above, when the thickness of the plate portion increases, the basic apparatus causes various problems such as deterioration and variation in quality, decrease in commercial value, and decrease in yield (productivity).

Moreover, in order to increase the productivity of the basic apparatus, each press unit must be opened and closed at high speed. However, since the basic apparatus is equipped with a laminated-substrate sandwiching unit including upper and lower sandwiching members for sandwiching a laminated substrate M in a sealed state, opening a press unit at high speed causes a phenomenon such that the plates of the upper and lower sandwiching members—which are in close contact with the opposite pressure-application surfaces of the press unit—are attracted by the opposite pressure-application surfaces, so that the upper and lower sandwiching members may be deformed and pull apart from each other. Although the deformation is small, the influence of the deformation on fabrication becomes impossible to ignore when the laminated substrate M (IC card) has a thickness of a few hundred micrometers, with the result that fabrication failure such as failure in thermocompression bonding occurs. Accordingly, the quality of IC cards deteriorates and varies, and the commercial value and yield of the IC cards decrease. In addition, the limit in relation to high speed open/close operation of each press unit lowers productivity and mass-production efficiency.

Furthermore, in such a basic apparatus, at the beginning of a pressure application step, the laminated substrate M is pressed by means of the upper and lower press platens in a state in which the thermoplastic sheets La and Lb of the laminated substrate M have not yet been plasticized sufficiently. Therefore, a relatively large pressure acts on the IC chip Pi itself, resulting in possible breakage of the IC chip Pi. Further, since the laminated substrate M has a sheet-like shape and a thickness of a few hundreds of micrometers, slight displacement of the press platen causes a great variation:in the applied pressure, with the result that pressure cannot be applied to the laminated substrate M in an accurate and stable manner. In order to solve this problem, an improved manufacturing apparatus has been proposed (see, for example, Japanese Patent Publication Nos. 1(1989)-54173 and 4(1992)-26299). In the improved apparatus, at least one of press platens is supported by an air cushion unit. Thus, the pressure applied to the press platen by means of a drive mechanism can be varied from a considerably low pressure to an intermediate pressure (or high pressure) in an accurate and stable manner. Such a conventional manufacturing apparatus has a single air cushion unit, which is suitable for applying a uniform pressure across the entire surface of a substrate to be pressed, but is not suitable for fabrication of thin IC cards, which must be of highly uniform thickness.

SUMMARY OF THE INVENTION

An object of the present invention is to provide an IC-card manufacturing apparatus which can bond a laminated substrate through thermocompression bonding by use of paired plate portions which always have a high degree of parallelism, to thereby increase production yield (productivity).

Another object of the present invention is to provide an IC-card manufacturing apparatus which can improve the quality and homogeneity of IC cards, remarkably increase yield and commercial value of the IC cards, and improve productivity and mass-production efficiency through realization of high speed open/close operation of a press unit.

Still another object of the present invention is to provide an IC-card manufacturing apparatus which can apply to a laminated substrate an accurate and stable pressure ranging from a considerably low pressure to an intermediate pressure (or high pressure), without being affected by the thickness of the laminated substrate, thereby enabling production of high-quality IC cards of uniform thickness.

In order to achieve the above objects, the present invention provides an IC-card manufacturing apparatus for manufacturing an IC card from a laminated substrate consisting of an electronic component, such as an IC chip, and sheet members, including thermoplastic-resin sheets, which sandwich the electronic component. The IC-card manufacturing apparatus is equipped with a thermocompression-bonding press unit which applies heat and pressure to the laminated substrate from opposite sides thereof by use of paired press platens having pressure-application surfaces to thereby effect thermocompression bonding. According to one aspect of the present invention, the IC-card manufacturing apparatus comprises a laminated-substrate sandwiching unit which is independent of the main body of the IC-card manufacturing apparatus and includes upper and lower sandwiching members for sandwiching the laminated substrate in a sealed state. Each of the upper and lower sandwiching members has a plate portion equal in size and shape with the corresponding pressure-application surface or projecting outward from the pressure-application surface by a predetermined amount; a frame portion bigger than the plate portion; and a connection portion which connects the plate portion and the frame portion and absorbs thermal deformation of the plate portion. During a process for applying pressure and heat to the laminated substrate, each press platen is brought into pressure contact with the corresponding plate portion so as to apply pressure and heat to the plate portion. In this process, each plate portion may deform (expand) due to heat (high temperature). However, by virtue of this configuration, such deformation is absorbed by the connection portion (a plurality of connection strips), so that the laminated substrate is bonded through thermocompression bonding by the paired plate portions which have high degree of parallelism at all times.

According to another aspect of the present invention, the IC-card manufacturing apparatus comprises at least one air passage which is formed in each press platen and has at least one air jetting opening formed on the pressure-application surface of the press platen; an air supply unit for supplying air to the air passage; and a control unit for controlling the air supply unit so as to supply air to the air passage for a preset period of time when the paired press platens are opened. By virtue of this configuration, when the paired press platens are opened, for a preset period of time air is supplied to each air passage from the air supply unit controlled by the control unit. Thus, air is jetted from the air jetting opening provided on each pressure-application surface. As a result, the laminated-substrate sandwiching unit is quickly separated from the pressure-application surfaces simultaneously with the opening of the press platens.

According to still another aspect of the present invention, at least one of the press platens is composed of a press-platen main body having a pressure-application surface and a press-platen base for applying pressure to the press-platen main body. A plurality of air cushion units are disposed between the press-platen main body and the press-platen base to be located at different positions; and a pressure setting unit for independently setting the respective pressures of the air cushion units is provided. By virtue of this configuration, when the thickness of the laminated substrate varies with position, the pressures of the respective air cushion units at different positions are set individually by the pressure setting unit; specifically, the pressure in a region corresponding to a thick portion of the laminated substrate is increased, whereas the pressure in a region corresponding to a thin portion of the laminated substrate is decreased. Through this pressure setting, the paired pressure-application surfaces for pressing the laminated substrate can be made parallel.

DETAILED DESCRIPTION OF THE PREFERRED EMBODIMENT

Figure 1:
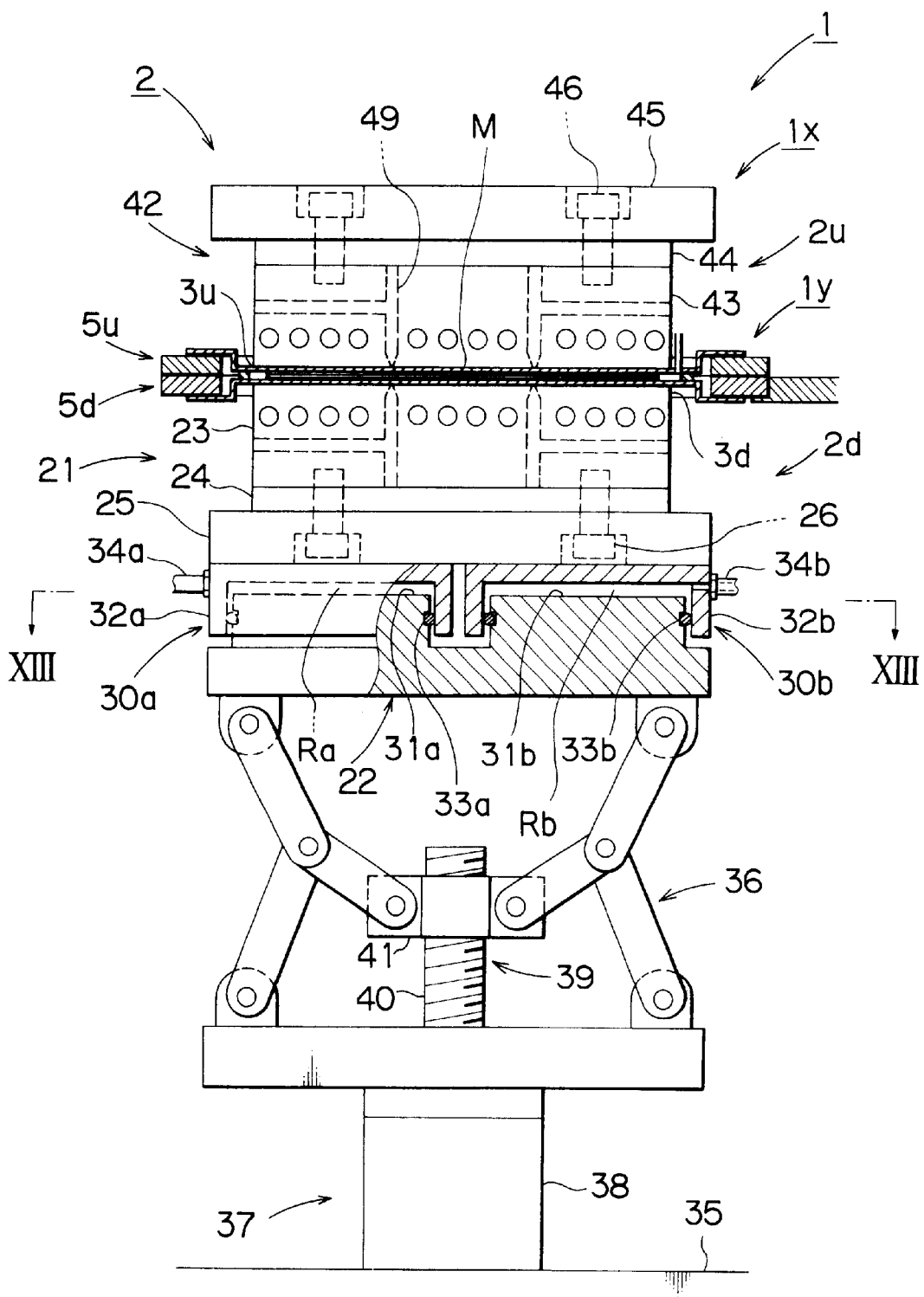
FIG. 1 is a partially-sectioned front view of a thermocompression-bonding press unit of an IC-card manufacturing apparatus according to an embodiment of the present invention.

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of an IC-card manufacturing apparatus 1 according to the present embodiment will be described with reference to FIGS. 1 to 13.

The IC-card manufacturing apparatus 1 comprises a manufacturing apparatus main body 1x and a laminated-substrate sandwiching unit 1y which is configured to be independent of the manufacturing apparatus main body 1x. The laminated-substrate sandwiching unit 1y includes an upper sandwiching member 5u and a lower sandwiching member 5d shown in FIG. 2. The upper sandwiching member 5u is superposed on the lower sandwiching member 5d in order to constitute the laminated-substrate sandwiching unit 1y whose interior is sealed. The upper sandwiching member 5u has an upper plate portion 6u and an upper rectangular frame portion 7u larger than the upper plate portion 6u. The upper plate portion 6u is superposed on:the top face of the laminated substrate M. The upper plate portion 6u may be formed from stainless-steel sheet of predetermined thickness. The upper plate portion 6u has a thickness of not greater than 3 mm, preferably a thickness of about 1 mm. Further, the upper plate portion 6u is formed to be equal in shape and size with a pressure-application surface 3u of the upper press platen 2u or to project outward from the pressure-application surface 3u by a predetermined amount Xe. The predetermined amount Xe is 5 to 10 mm.

Figure 3:
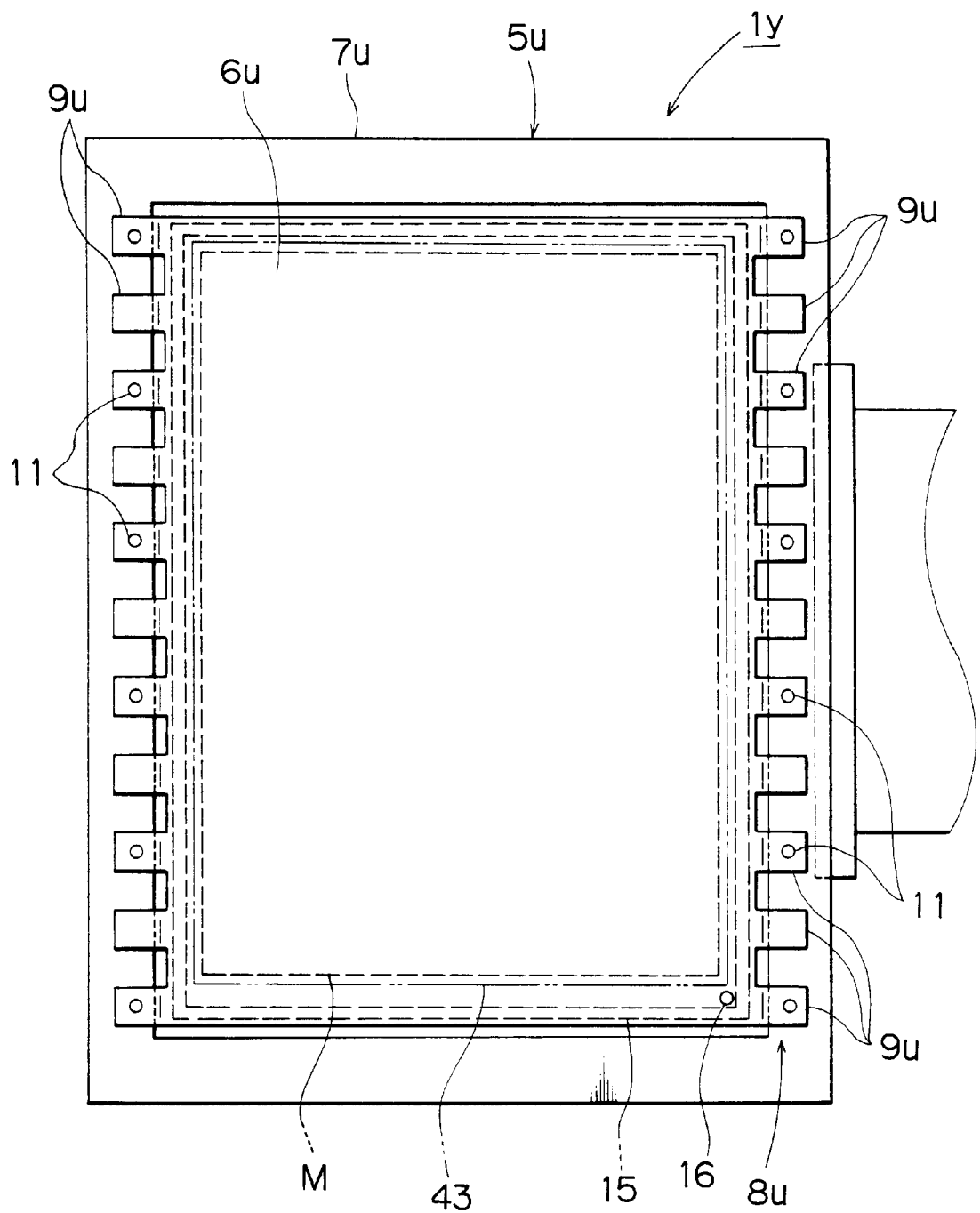
FIG. 3 is a plan view of a laminated-substrate sandwiching unit of the IC-card manufacturing apparatus.
Figure 4:
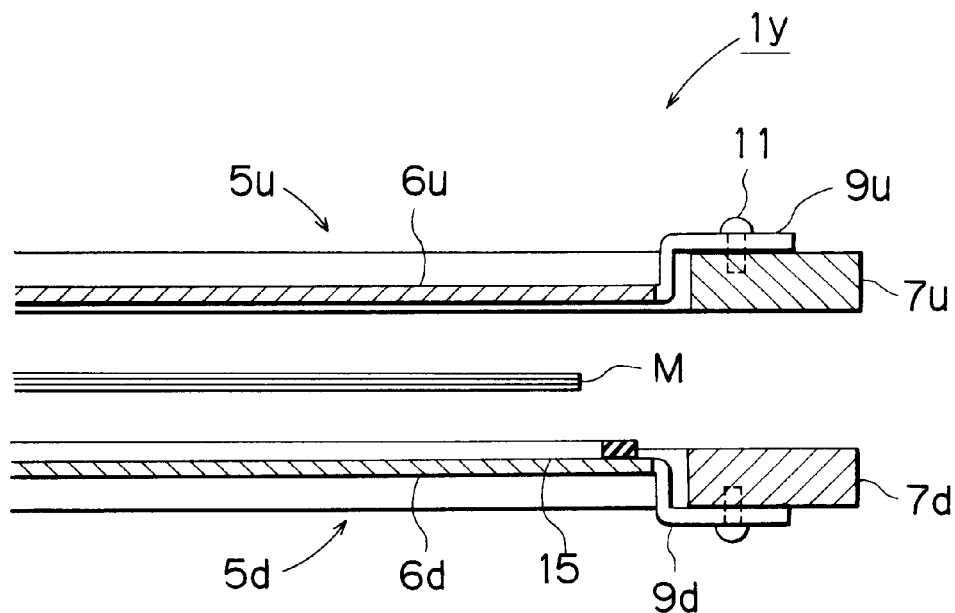
FIG. 4 is an enlarged sectional front view showing a portion of the laminated-substrate sandwiching unit of the IC-card manufacturing apparatus.
Figure 5:
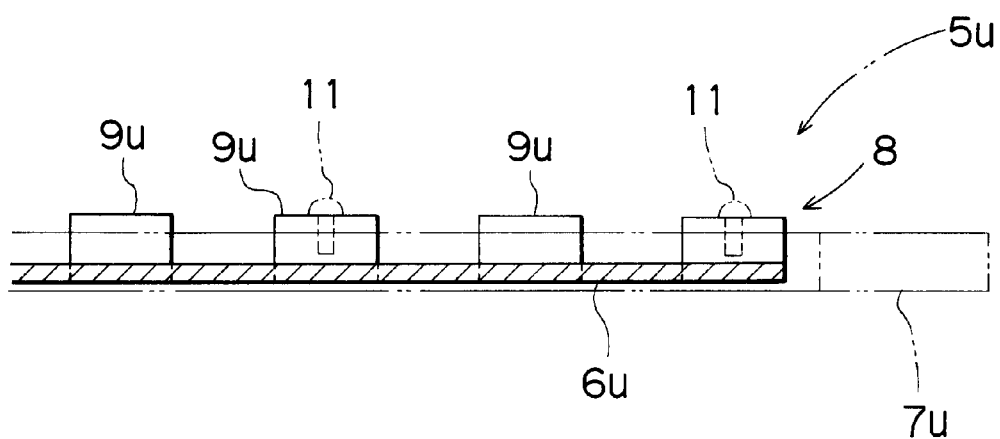
FIG. 5 is an enlarged sectional side view showing a portion of the laminated-substrate sandwiching unit of the IC-card manufacturing apparatus.

The upper plate portion 6u is connected to the upper frame portion 7u via a connection portion 8u, which absorbs thermal deformation of the upper plate portion 6u. As shown in FIG. 3, the connection portion 8u consists of a plurality of rectangular connection strips 9u, which are formed integrally with the upper plate portion 6u. The connection strips 9u project from the opposite side edges of the upper plate portion 6u at constant intervals along the corresponding side edge. In the present embodiment, each connection strip 9u is formed to project in a direction Hd intersecting a direction Hs in which the upper plate portion 6u deforms; i.e., as shown in FIG. 4, each connection strip 9u is bent into a crank shape. All or some of the connection strips 9u are fixed at their tip ends to the upper frame portion 7u by means of fixing screws 11.

The lower sandwiching member 5d has the same basic configuration as that of the upper sandwiching member 5u. Reference numeral 6d denotes a lower plate portion; 7d denotes a lower frame portion; 8d denotes a connection portion; and 9d denotes a plurality of connection strips. A seal member 15 is fixed onto the upper surface of the lower plate portion 6d such that the seal member 15 extends along the peripheral edge of the lower plate portion 6d.

Figure 2:
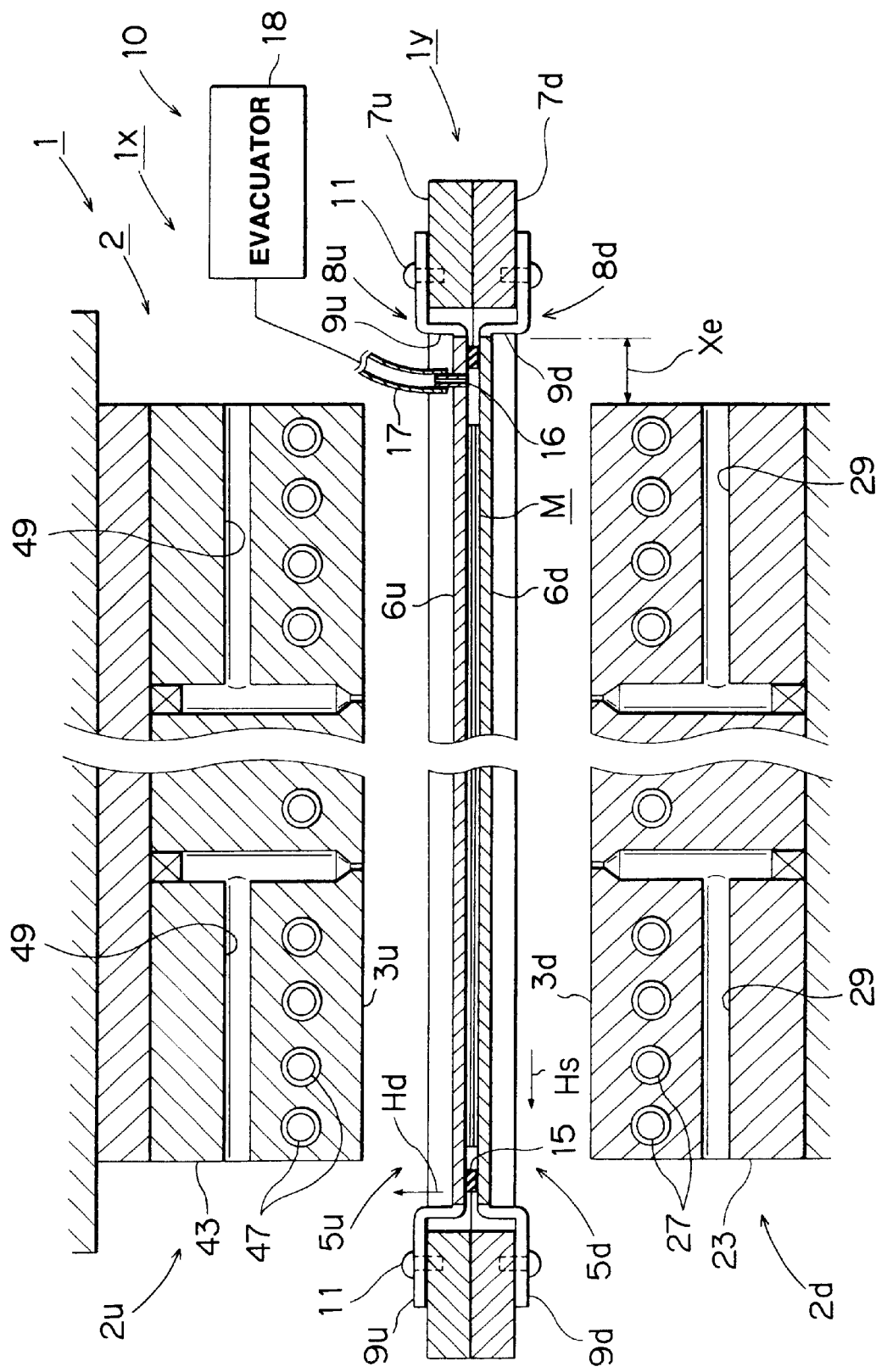
FIG. 2 is a sectional front view showing a main portion of the thermocompression-bonding press unit of the IC-card manufacturing apparatus.
Figure 6:
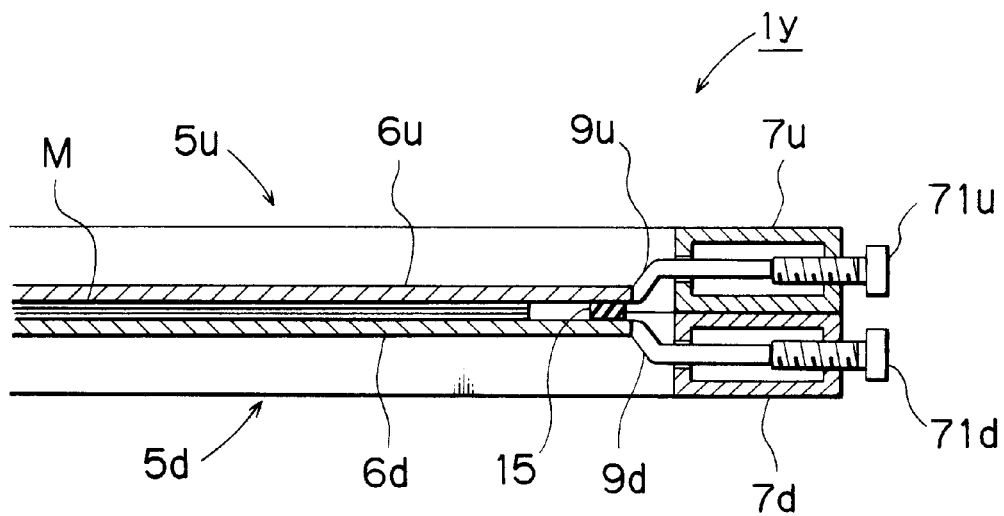
FIG. 6 is an enlarged sectional front view showing a portion of a laminated-substrate sandwiching unit according to a modification of the IC-card manufacturing apparatus.

In the present embodiment, the connection strips 9u are formed integrally with the upper plate portion 6u, and the connection strips 9d are formed integrally with the lower plate portion 6d. However, the connection strips 9u and 9d may be formed separately from the plate portions 6u and 6d, from the same material or a different material. In the present embodiment, the tip ends of the connection strips 9u and 9d are fixed to the frame portions 7u and 7d by means of screws. However, a support structure as shown in FIG. 6 may be employed. That is, the tip ends of the connection strips 9u and 9d are movably inserted into the frame portions 7u and 7d, respectively; and adjustment screws 71u and 71d are screwed into the: outer side walls of the frame portions 7u and 7d in order to finely adjust the positions of the plate portions 6u and 6d. In FIG. 6, the same portions as those shown in FIG. 2 are denoted by the same reference numerals.

Figure 7:
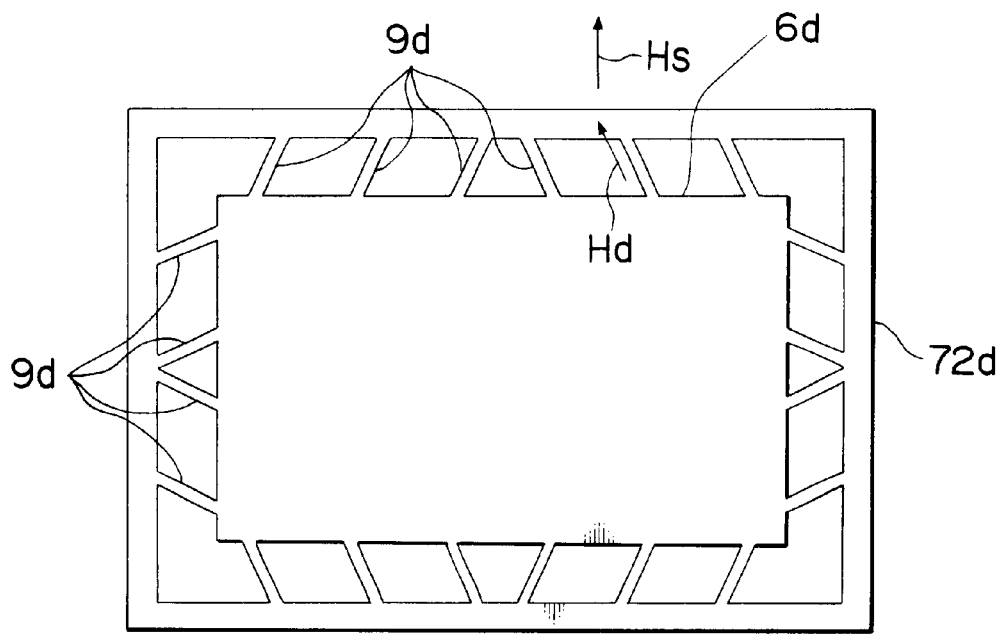
FIG. 7 is a plan view of the plate portion and connection portion of a laminated-substrate sandwiching unit according to another modification of the IC-card manufacturing apparatus.
Figure 8:
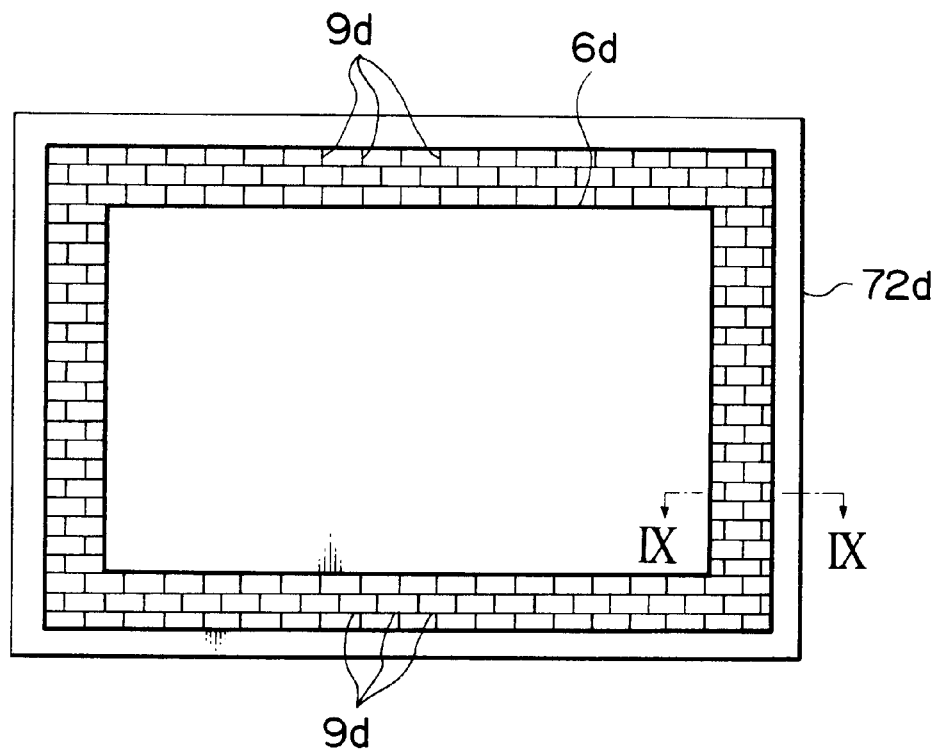
FIG. 8 is a plan view of the plate portion and connection portion of a laminated-substrate sandwiching unit according to still another modification of the IC-card manufacturing apparatus.
Figure 9:
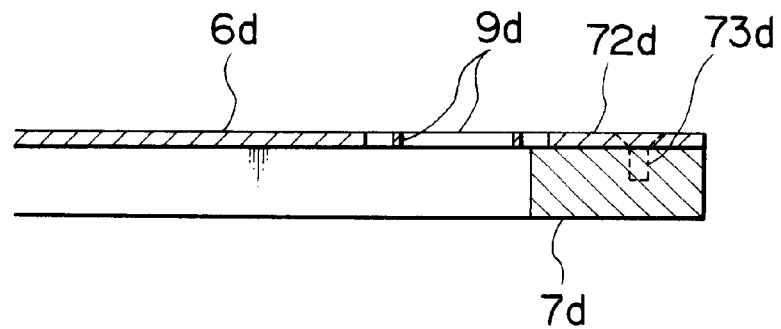
FIG. 9 is an enlarged sectional front view showing a portion of the laminated-substrate sandwiching unit shown in FIG. 8 (sectional view taken along line IX—IX in FIG. 8)

In the present embodiment, each connection strip 9d is bent into a crank shape in order to project in a direction Hd intersecting the direction Hs of deformation of the plate portion 6d (each connection strip 9u has the same configuration). However, each connection strip 9d may assume the configuration shown in FIG. 7. That is, each connection strip 9d is formed to extend along the same plane as that of the plate portion 6d and incline with respect to the corresponding side edge of the plate portion 6d. In FIG. 7, reference numeral 72d denotes an attachment frame to be attached to the frame portion 7d. The attachment frame 72d, the connection strips 9d, and the plate portion 6d can be formed as a single member by use of a punching press. Further, the connection strips 9d (and the connection strips 9u) may be formed of thin ribs which are combined as shown in FIG. 8. In this case as well, each of the connection strips 9d (9u) includes a portion which extends in a direction intersecting the direction of deformation of the plate portion 6d (6u). The configurations shown in FIGS. 7 and 8 provide the same effect as that obtained from the configuration shown in FIGS. 2 to FIG. 5. When the configuration shown in FIG. 7 or 8 is employed, the attachment frame 72d can be fixed directly to the frame portion 7d by means of fixing screws 73d, as is shown in FIG. 9.

Referring back to FIG. 2, an evacuation port 16 is provided on the upper plate portion 6u. The evacuation port 16 is connected to an evacuator (e.g., vacuum pump) 18 via an air pipe 17. Thus, an evacuation unit 10 for evacuating air from the interior of the laminated-substrate sandwiching unit 1y is formed. Operation of the evacuation unit 10 can be switched between an air evacuation mode for evacuating air from the interior of the laminated-substrate sandwiching unit 1y and an air supply mode for supplying air into the interior of the laminated-substrate sandwiching unit 1y from the evacuation port 16. Moreover, an unillustrated positioning member is provided at a predetermined position on each of the upper and lower frame portions 7u and 7d in order to enable mutual positioning between the upper and lower frame portions 7u and 7d when the upper frame portion 7u is placed on the lower frame portion 7d.

Meanwhile, the manufacturing apparatus main body 1x has three press units; i.e., a pre-heating press unit (not shown), the thermocompression-bonding press unit 2, and a cooling press unit (not shown). FIG. 1 shows the thermocompression-bonding press unit 2 only. The thermocompression-bonding press unit 2 has a stationary press platen 2u disposed on the upper side and a movable press platen 2d disposed on the lower side.

As shown in FIG. 1, the movable press platen 2d includes a press-platen main body 21 having a pressure-application surface 3d and a press-platen base 22 for applying pressure to the press-platen main body 21. The press-platen main body 21 is composed of a support platen 25, a heat-insulating member 24, and a hot platen member 23, which are successively stacked and integrated into a single unit by means of fixing bolts 26. An upper surface of the hot platen member 23 serves as the heat-application surface 3d. A large number of bar heaters 27 are embedded in the hot platen member 23 (see FIG. 2).

Figure 10:
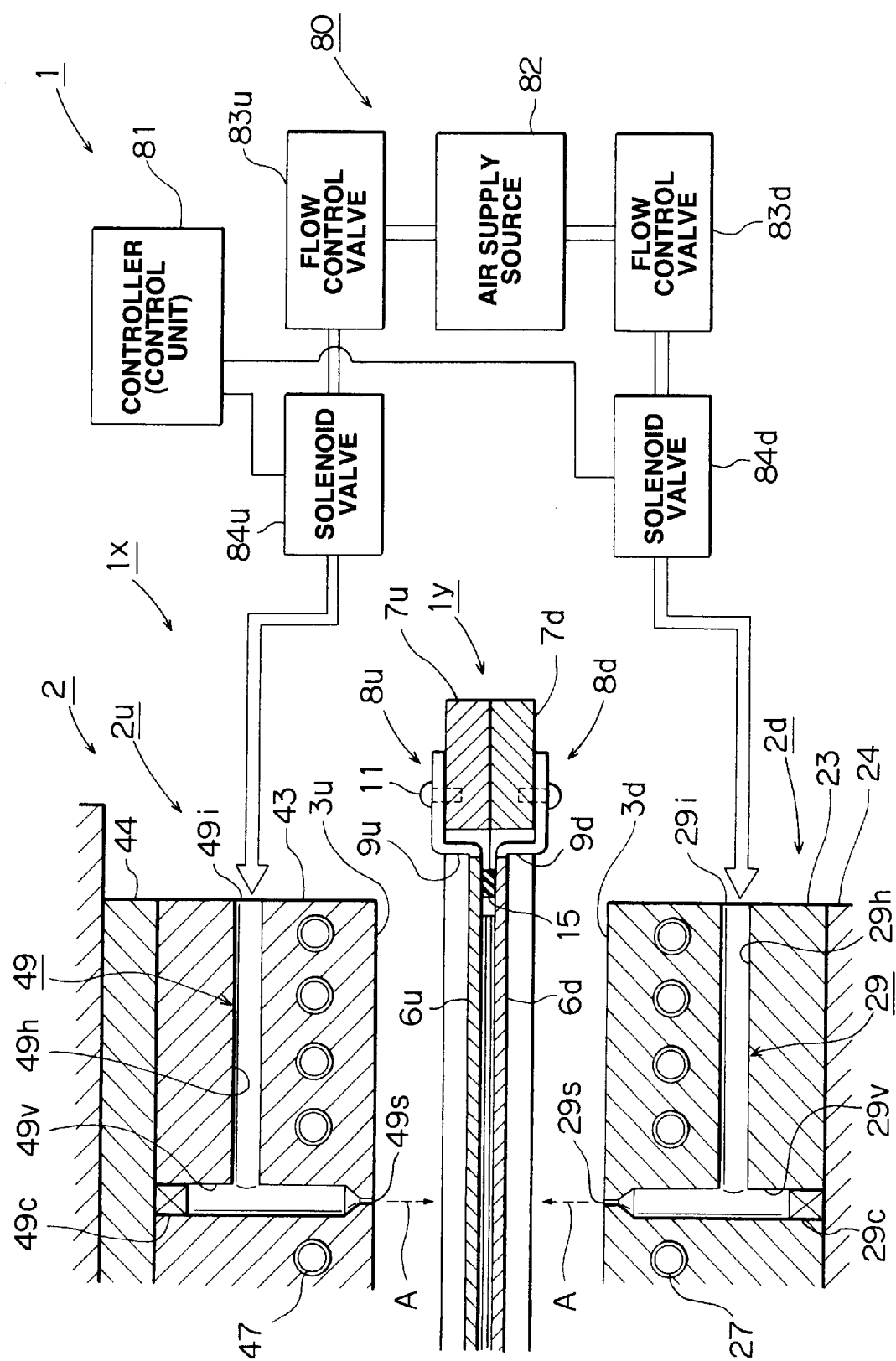
FIG. 10 is another sectional front view showing a main portion of the thermocompression-bonding press unit of the IC-card manufacturing apparatus.
Figure 11:
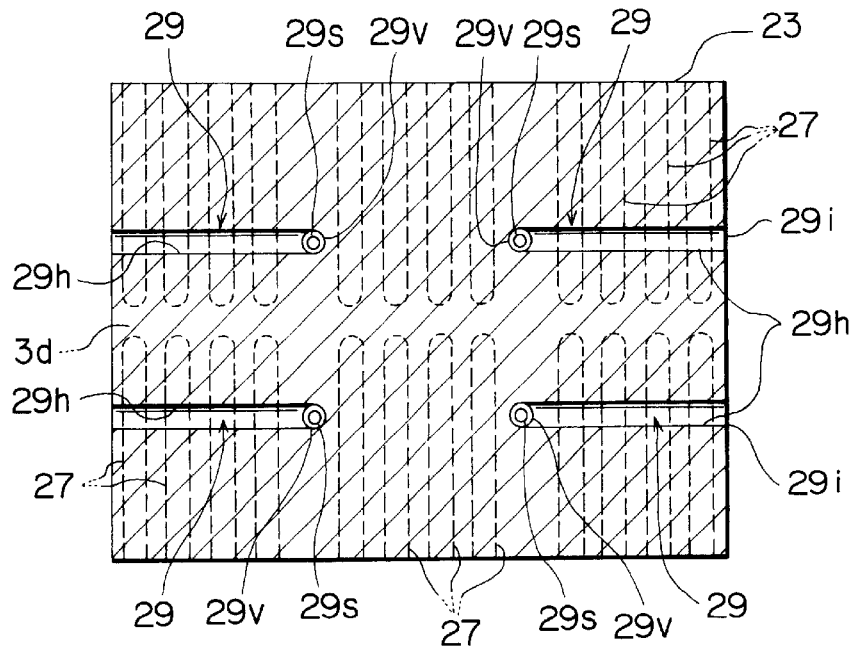
FIG. 11 is a sectional view taken along line XI—XI in FIG. 12.
Figure 12:
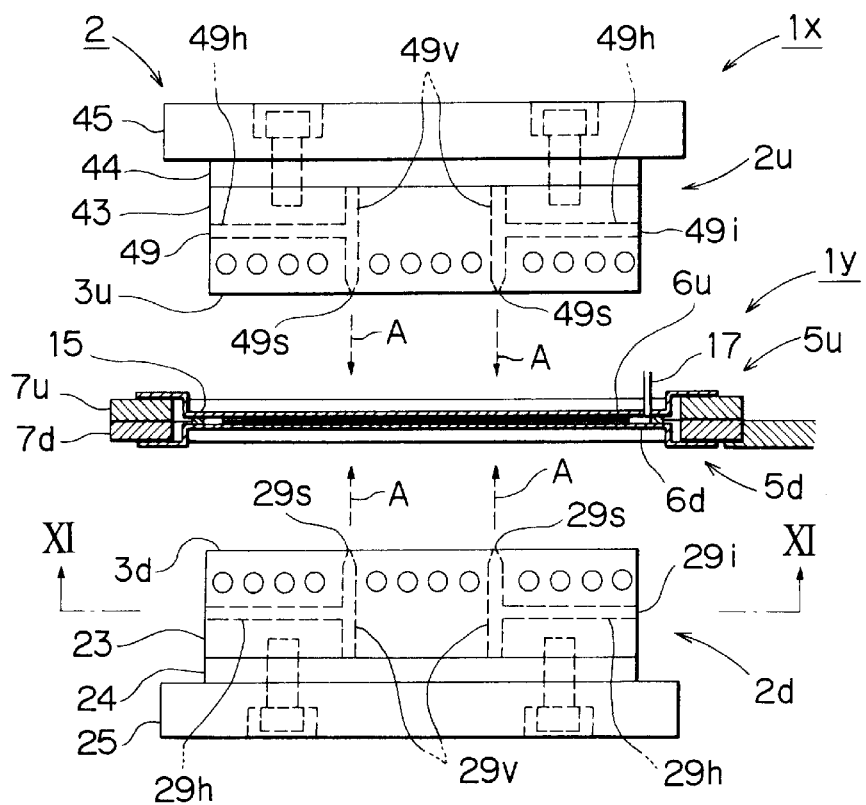
FIG. 12 is a partially-sectioned front view of the IC-card manufacturing apparatus, showing the state of the thermocompression-bonding press unit being opened.

Further, four air passages 29 are formed in the hot platen member 23 at positions which do not interfere with the bar heaters 27. As shown in FIG. 10, each of the air passages 29 has a vertical air path 29v which penetrates the hot platen member 23 in the vertical direction; and a horizontal air path 29h which extends horizontally from one side surface of the hot platen member 23 to an intermediate portion of the Vertical air path 29v. The lower end of the vertical air path 29v is closed by means of a cap 29c. The opening on the side surface of the horizontal air path 29h serves as an air, supply port 29i, and the opening on the pressure-application surface 3d—which is the upper surface of the hot platen member 23—serves as an air jetting opening 29s. The air jetting opening 29s is formed to have a relatively small size of, for example, about 1 mm, to thereby prevent the air jetting opening 29s from affecting the heating characteristics of the pressure-application surface 3d (hot platen member 23). As shown in FIG. 11, four air jetting openings 29s are formed at four different locations on the pressure-application surface 3d. Formation of the air jetting openings 29s on the pressure-application surface 3d is not preferred in ordinary IC-card manufacturing apparatuses. However, in the IC-card manufacturing apparatus of the present embodiment, since the laminated substrate M accommodated in the laminated-substrate sandwiching unit 1y does not come into direct contact with the pressure-application surface 3d, formation of the air jetting openings 29s on the pressure-application surface 3d does not affect the quality of IC cards.

Figure 13:
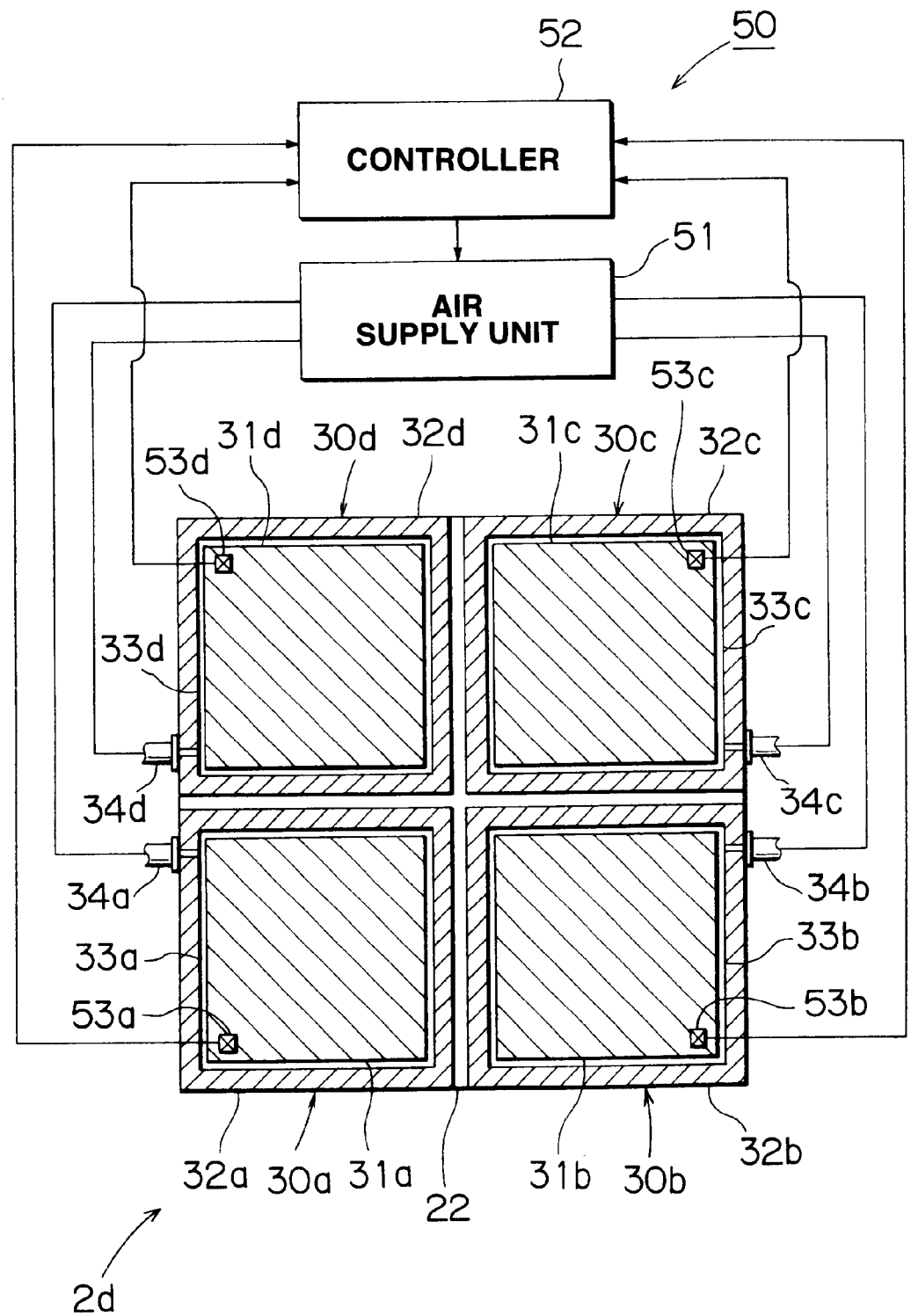
FIG. 13 is a sectional view taken along line XIII—XIII in FIG. 1.
Figure 14:
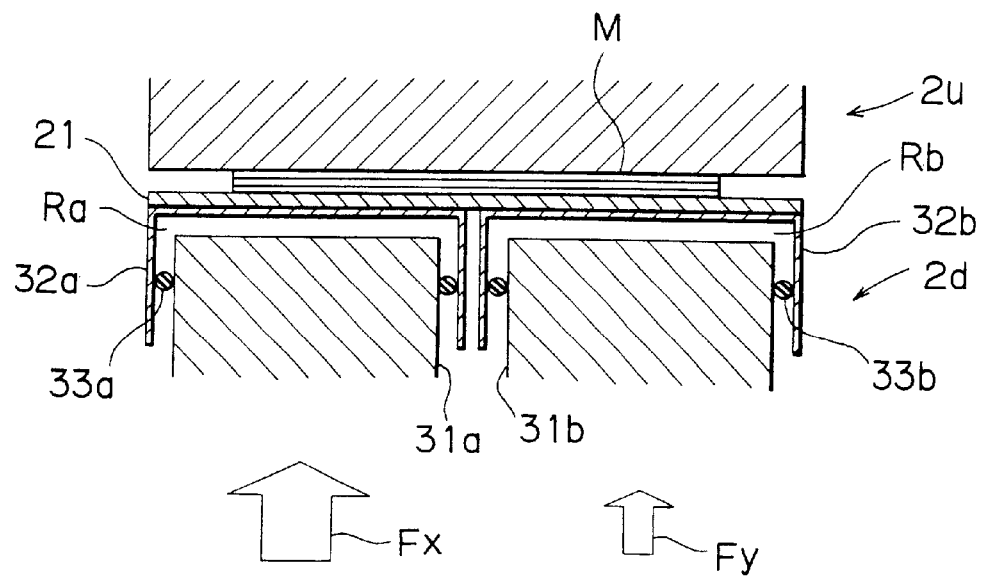
FIG. 14 is a schematic sectional view used for describing the principle of the IC-card manufacturing apparatus.

As shown in FIGS. 1, 13, and 14, four air cushion units 30a, 30b, 30c, and 30d are disposed between the press-platen main body 21 and the press-platen base 22 to be located at four different positions. As shown in FIG. 13, the air cushion units 30a, 30b, 30c, and 30d are disposed symmetrically with respect to the center of the press-platen base 22 in the vertical and horizontal directions. The air cushion unit 30a (30b, 30c, 30d) includes a rectangular convex member 31a (31b, 31c, 31d) formed integrally with the press-platen base 22; and a concave member 32a (32b, 32c, 32d) having a concave portion on the lower surface thereof and fitted onto the convex member 31a (31b, 31c, 31d) from above. A seal ring 33a (33b, 33c, 33d) is fitted into a groove formed on. the circumferential surface of the convex member 31a (31b, 31c, 31d) in order to establish sealing between the concave member 32a (32b, 32c, 32d) and the convex member 31a (31b, 31c, 31d). The upper surface of the concave member 32a (32b, 32c, 32d) is joined to the lower surface of the support platen 25. Thus is formed the air cushion unit 30a (30b, 30c, 30d) which has a closed air chamber Ra (Rb, Rc, Rd) between the concave member 32a (32b, 32c, 32d) and the convex member 31a (31b, 31c, 31d). Therefore, the concave member 32a (32b, 32c, 32d) can be moved vertically relative to the convex member 31a (31b, 31c, 31d). Air supply ports 34a, 34b, 34c, and 34d are provided on the concave members 32a, 32b, 32c, and 32d, respectively. An air supply unit 51 including an air compressor, an air control circuit, and other components is connected to the air supply ports 34a, 34b, 34c, and 34d.

Reference numeral 52 denotes a controller for controlling the air supply unit 51. Reference numerals 53a, 53b, 53c, and 53d denote pressure sensors for detecting the pressures of the air chambers Ra, Rb, Rc, and Rd and for supplying to the controller 52 detection signals indicating the detected pressures. Thus is formed a feedback control system for controlling the pressures of the air chambers Ra, Rb, Rc, and Rd to respective target values; i.e., a pressure setting unit 50 for individually setting the pressures of the air cushion units 30a, 30b, 30c, and 30d.

Referring back to FIG. 1, reference numeral 35 denotes a machine base. The movable press platen 2d is supported by a toggle link mechanism 36 disposed between the machine base 35 and the movable press platen 2d. Reference numeral 37 denotes a drive mechanism for driving the toggle link mechanism 36. The drive mechanism 37 includes a servomotor 38 attached to the machine base 35 and a ball-screw mechanism 39 driven by the servomotor 38. A ball screw 40 of the ball-screw mechanism 39 is rotated by the servomotor 38. A nut 41 of the ball-screw mechanism 39 serves as an input member of the toggle link mechanism 36.

The stationary press platen 2u is provided with a press-platen main body 42 having a pressure-application surface 3u. Unlike the lower-side press-platen main body 21, the press-platen main body 42 is fixed directly to an unillustrated, fixed press-platen base. The press-platen main body 42 is composed of a support platen 45, a heat-insulating member 44, and a hot platen member 43, which are successively stacked and integrated into a single unit by means of fixing bolts 46. A lower surface of the hot platen member 43 serves as the heat-application surface 3u. As shown in FIG. 10, a large number of bar heaters 47 are embedded in the hot platen member 43, and four air passages 49 are formed therein. The air passages 49 are formed in a manner which is basically the same as that of the air passages 29 provided in the hot platen member 23. In each air passage 49, reference numeral 49v denotes a vertical air path; 49h denotes a horizontal air path; 49c denotes a cap; 49i denotes an air supply port 49i; and 49s denotes an air jetting opening:

As shown in FIG. 10, the IC-card manufacturing apparatus 1 of the present embodiment has an air supply unit 80 for supplying air A to the air supply ports 29i and 49i; and a control unit 81 for controlling the air supply unit 80. The control unit (controller) 81 controls the air supply unit 80 so as to supply air to the air passages 49 and 29 for a preset period of time when the paired press platens 2u and 2d are opened. The air supply unit 80 includes an air supply source 82 such as an air compressor. The air supply source 82 is connected to the air supply ports 49i via a flow control valve 83u and a solenoid valve 84u and is also connected to the air supply ports 29i via a flow control valve 83d and a solenoid valve 84d. The solenoid valves 84u and 84d are connected to the control unit 81.

Next, the operation (function) of the IC-card manufacturing apparatus according to the present embodiment will be described with reference to the drawings.

First, the laminated substrate M is accommodated in the laminated-substrate sandwiching unit 1y. Specifically, the laminated substrate M is placed on the upper surface of the lower sandwiching member 5d, and the upper sandwiching member 5u is superposed thereon in order to sandwich the laminated substrate M between the upper sandwiching member 5u and the lower sandwiching member 5d. Subsequently, the evacuator 18 is operated so as to evacuate air from the interior of the laminated-substrate sandwiching unit 1y. Consequently, the laminated substrate M is pressed from both sides by the upper sandwiching member 5u and the lower sandwiching member 5d, and air bubbles contained in the laminated substrate M are removed completely.

The laminated-substrate sandwiching unit 1y accommodating the laminated substrate M is first pre-heated by the unillustrated pre-heating press unit. That is, the laminated-substrate sandwiching unit 1y is pressed by paired press platens and is heated to a pre-heating temperature lower than a regular heating temperature employed during thermocompression bonding; specifically, to a temperature (e.g., about 70° C.) just below the temperature at which plastic deformation or fusion of the hot-melt sheets Ta and Tb starts. During such pre-heating process, the laminated substrate M is gradually heated to the pre-heating temperature while being pressed, and thus degassing is accelerated.

Next, the laminated-substrate sandwiching unit 1y having undergone the pre-heating is supplied to the thermocompression-bonding press unit 2. At this point in time, the movable press platen 2d is located at a descended position. Therefore, when the servomotor 38 is operated after placement of the laminated-substrate sandwiching unit 1y on the movable press platen 2d, the nut 41 is moved upward, so that the movable press platen 2d is raised through action of the toggle link mechanism 36. When the laminated-substrate sandwiching unit 1y comes into contact with the upper-side pressure-application surface 3u and a very small pressure is applied to the laminated-substrate sandwiching unit 1y, the upward movement of the movable press platen 2d is stopped temporarily.

Figure 15:
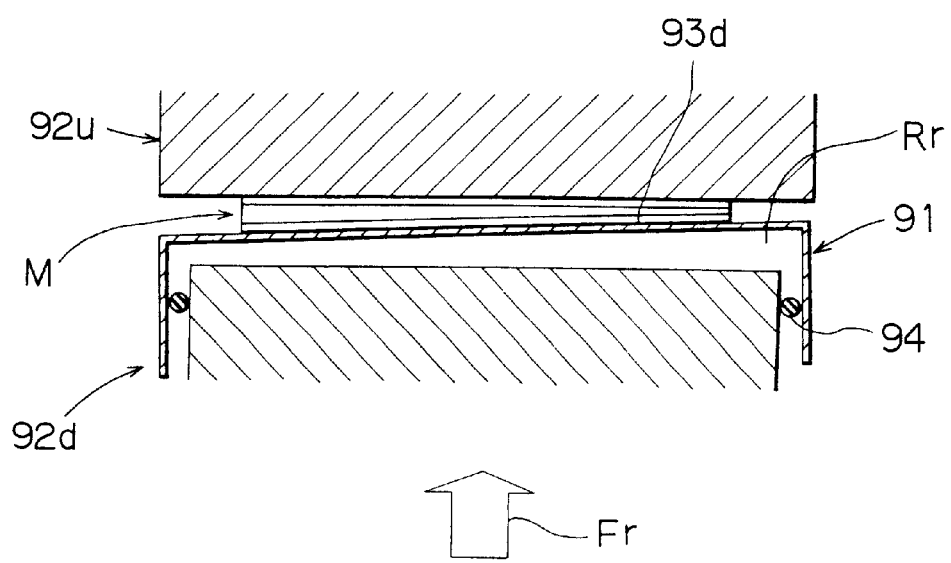
FIG. 15 is a schematic sectional view used for describing the principle of a conventional IC-card manufacturing apparatus.
Figure 16:
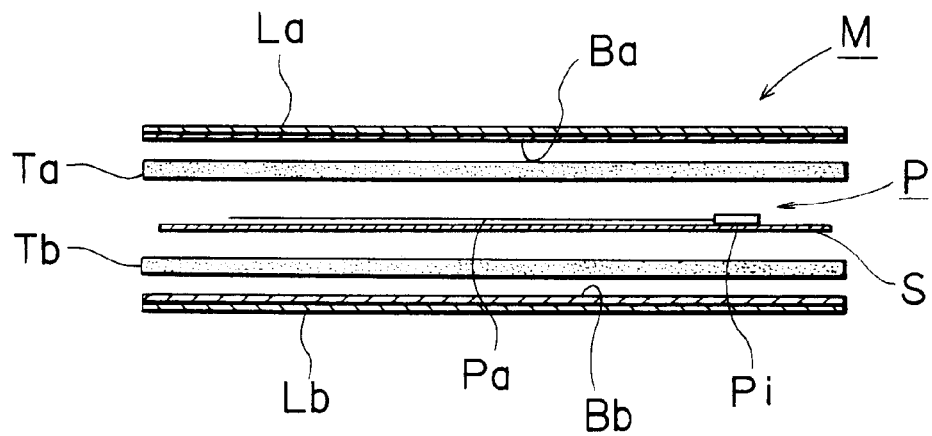
FIG. 16 is an exploded sectional front view of a laminated substrate manufactured by use of an IC-card manufacturing apparatus.
Figure 17:
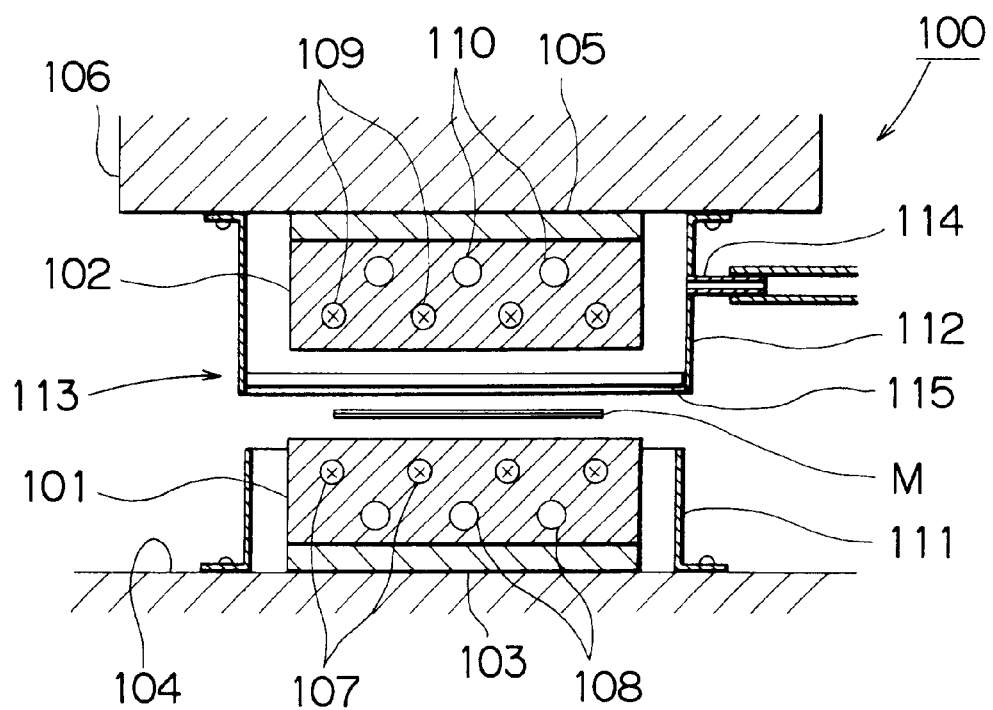
FIG. 17 is a vertical cross section of a conventional IC-card manufacturing apparatus.

When the thickness of the laminated substrate M varies with position, the pressures of the air cushion units 30a to 30d are set individually to different levels by use of the pressure setting unit 50. Specifically, the pressure of a region corresponding to a thick portion of the laminated substrate M is set to a high level, and the pressure of a region corresponding to a thin portion of the laminated substrate M is set to a low level. Thus, the pressure-application surfaces 3u and 3d pressing the laminated substrate M become parallel to each other. In a conventional manufacturing apparatus equipped with a single air cushion unit, as shown in a schematic view of FIG. 15, when a pressure in the direction of arrow Fr is applied to a movable-side press platen 92d having an air cushion unit 91, a pressure-application surface 93d of the movable-side press platen 92d inclines if the thickness of a laminated substrate M varies with position due to presence of a component embedded therein. Therefore, the conventional manufacturing apparatus is not suitable for production of a thin IC card that must be of highly uniform thickness, although the conventional manufacturing apparatus is suitable for applying uniform pressure over the entire surface of a substrate. By contrast, in the present embodiment, four air cushion units 30a to 30d are provided at different positions, and, as shown in FIG. 14, the pressure (indicated by arrow Fx) of the air cushion unit 30a (30d) is set high, whereas the pressure (indicated by arrow Fy) of the air cushion unit 30b (30c) is set low. Therefore, an IC card of uniform thickness can be fabricated from a laminated substrate M whose thickness varies with position as shown in FIG. 15. In FIG. 15, reference character Rr denotes an air chamber of the air cushion unit 91; 94 denotes a seal ring; and 92u denotes a stationary-side press platen.

The stationary press platen 2u and the movable press platen 2d are heated to a regular heating temperature (e.g., about 120° C.) by the bar heaters 47 and 27, respectively. Notably, even when the laminated substrate M is moved from the pre-heating press unit to the thermocompression bonding unit 2, the heated and pressed state is maintained reliably; i.e., the temperature and pressure of the laminated substrate M are maintained, because the laminated substrate M is accommodated within the sealed laminated-substrate sandwiching unit; 1y which holds the laminated substrate M from opposite sides thereof by the upper and lower sandwiching members 5u and 5d and from which air has been evacuated by the evacuator 18.

When the laminated substrate M has been softened (plasticized) after elapse of a preset time, the servomotor 38 is operated again in order to elevate the movable press platen 2d. The movable press platen 2d is stopped when the pressure-application surface 3d has reached a position corresponding to, the thickness of an IC card to be fabricated. As a result, the laminated-substrate sandwiching unit 1y is heated and pressed from above and below by means of the stationary platen 2u and the movable press platen 2d, whereby the laminated substrate M undergoes thermocompression bonding. During this thermocompression bonding process, the plate portions 6u and 6d of the laminated-substrate sandwiching unit 1y deform (expand) due to heat (high temperature). However, since such deformation is absorbed by the plurality of connection strips 9u and 9d, the laminated substrate M is thermally bonded under pressure by the paired plate portions 6u and 6d having a high degree of parallelism.

Subsequently, upon elapse of a preset pressure-application time (e.g., about 20 sec), the movable press platen 2d is descended. At this time, the control unit 81 opens the solenoid valves 84u and 84d in order to supply air A to the air passages 29 and 49 for a preset period of time. The timings (preset times) for opening and closing the solenoid valves 84u and 84d are determined such that the solenoid valves 84u and 84d are opened a few seconds before the movable press platen 2d starts its descending motion and are closed when a period of a few seconds has passed after initiation of the descending motion. When the period of time during which the solenoid valves 84u and 84d are opened is excessively long, the hot platen members 23 and 44 and the laminated-substrate sandwiching unit 1y are cooled (air-cooled). Therefore, the period of time is set so as not to be excessively long.

The timings for opening and closing the solenoid valves 84u and 84d may be set arbitrarily in accordance with the type of the laminated substrate M to undergo thermocompression bonding and other factors. Further, the solenoid valves 84u and 84d may be opened and closed concurrently or at different timings such that one of the solenoid valves 84u and 84d is opened earlier or for a longer period of time than is the other. Further, the hot platen member 23 is modified such that a solenoid valve 84u is provided for and connected to each of the plurality of air passages 29, and air is supplied to each of the plurality of air passages 29 under different conditions. The hot paten member 44 may be modified similarly.

Supply of air to the air passages 29 and 49 reliably prevents the upper and lower sandwiching members 7u and 7d of the laminated-substrate sandwiching unit 1y from being attracted by the pressure-application surfaces 3u and 3d even when the opening closing speed, in particular, opening speed of the movable press platen 2d, is increased. Such attraction by the pressure-application surfaces 3u and 3d would otherwise occur when the movable press platen 2d is opened. Therefore, the laminated-substrate sandwiching unit 1y can be reliably separated from the pressure-application surfaces 3u and 3d.

After the movable press platen 2d has descended, the laminated substrate M having undergone thermocompression bonding (i.e., a fabricated IC card) is transferred to the cooling press unit in order to cool the laminated substrate M (i.e., the fabricated IC card). In the cooling process, the IC card is cooled while being pressed. In order to remove the IC card from the laminated-substrate sandwiching unit 1y after the cooling process, air is supplied to the interior of the laminated-substrate sandwiching unit 1y from the evacuation port 116. As result of air supply, the laminated-substrate sandwiching unit 1y is released from the evacuated state, and the laminated substrate M separates from the laminated-substrate sandwiching unit 1y. Therefore, the fabricated IC card can be removed after the upper sandwiching member 7u is raised.

Notably, during the above-described processes, the upper frame portion 7u and the lower frame portion 7d are heated to a temperature between (about the average of) the heating temperature and the cooling temperature of the plate portions 6u and 6d. In an exemplary case in which the plate portions 6u and 6d are cooled to 40° C. after being heated to 140° C., the upper and lower frame portions 7u and 7d are heated to 90° C. This temperature control halves the temperature difference between the plate portions 6u and 6d and the upper and lower frame portions 7u and 7d.

As described above, in the IC-card manufacturing apparatus 1 according to the present embodiment, when the plate portions 6u and 6d deform due to heat, such deformation is absorbed by the plurality of connection strips 9u and 9d. Therefore, the laminated substrate M is bonded through thermocompression bonding by the paired plate portions 6u and 6d having a high degree of parallelism. Accordingly, production yield (productivity) can be improved. In addition, the quality, homogeneity, and commercial value of IC cards can be improved. Such advantages can be attained effectively through employment of the laminated-substrate sandwiching unit which includes upper and lower sandwiching members for sandwiching the laminated substrate in a sealed state. In addition, since the laminated substrate does not come into direct contact with the pressure-application surfaces, provision of air jetting openings on the pressure-application surfaces does not adversely affect the quality of IC cards.

When the paired press platens 2u and 2d are opened, for a preset period of time air is supplied to the air passages 49 and 29 from the air supply unit 80 controlled by the control unit 81, so that air is jetted from the air jetting openings 49s and 29s provided on the pressure-application surfaces 3u and 3d. Therefore, the laminated-substrate sandwiching unit 1y is quickly separated from the pressure-application surfaces 3u and 3d simultaneously with the opening of the ,press platens 2u and 2d. Accordingly, the quality and homogeneity of IC cards can be improved, and yield and commercial value of the IC cards are remarkably increased. In addition, productivity and mass-production efficiency can be increased through realization of high-speed open/close operation of a press unit.

Even when the thickness of the laminated substrate M varies with position, the paired pressure-application surfaces 3u and 3d for pressing the laminated substrate M can be made parallel. This enables accurate and stable application of pressure ranging from very low pressure to intermediate pressure (or high pressure). In addition, high-quality IC cards of uniform thickness can be fabricated without being affected by variation in thickness of the laminated substrate M. Further, since the air cushion units 30a to 3d are provided for the movable press platen 2d, which is pressed by the drive mechanism 37 having the toggle link mechanism 36, pressure control does not come into an uncontrollable state, so that pressure control is performed properly, even when the toggle link mechanism 36 has a large force amplification ratio.

While the present invention has been described with reference to the preferred embodiment, the present invention is not limited thereto. Regarding structural details, shape, material, quantity, techniques, numerical values, among others, modifications and any omission or addition may be possible as needed without departing from the scope of the invention. For-example, the configuration and material of the laminated substrate M (IC card) are not limited to those employed in the embodiment, and the laminated substrate M (IC card) may have a different configuration and/or may be made from a different material. The thermocompression press unit described in the above-described embodiment is an example of a pressure-application press unit to which the present invention can be applied. However, the present invention can be similarly practiced in a pre-heating press unit and in a cooling press unit. Further, the above-described embodiment exemplifies the case in which four air passages 29 are provided in the lower press platen 2d and four air passages 49 are provided in the upper press platen 2u. However, a single air passage or an arbitrary number of air passages may be provided in each of the upper and lower press platens 2u and 2d. Further, the configuration, such as shape, of the air passages can be determined arbitrarily. Moreover, in the embodiment, the air cushion units 30a to 30d are provided for the lower press platen 2d. However, the air cushion units 30a to 30d may be provided for the upper press platen 2u, or may be provided for both the upper and lower press platens 2u and 2d. Furthermore, in the embodiment, the four air cushion units 30a to 30d are arranged symmetrically. However, the number and layout of the air cushion units 30a to 30d are arbitrary. Notably, the number of the air cushion units 30a to 30d is preferably three or more.

What is claimed is:

1. An IC-card manufacturing apparatus for manufacturing an IC card from a laminated substrate consisting of an electronic component and resin sheets which sandwich the electronic component, the IC-card manufacturing apparatus comprising:
   a thermocompression-bonding press unit which applies heat and pressure to the laminated substrate from opposite sides thereof by use of paired press platens having pressure-application surfaces to thereby effect thermocompression bonding; and
   a laminated-substrate sandwiching unit which is independent of a main body of the IC-card manufacturing apparatus and includes upper and lower sandwiching members for sandwiching the laminated substrate in a sealed state,
   each of the upper and lower sandwiching members having a plate portion equal in size and shape with the corresponding pressure-application surface or projecting outward from the pressure-application surface by a predetermined amount, a frame portion bigger than the plate portion, and a connection portion which connects the plate portion and the frame portion and absorbs thermal deformation of the plate portion, wherein an evacuation port is provided inward of said frame portion on a flat area of the plate portion.

2. An IC-card manufacturing apparatus according to claim 1, wherein the plate portion projects outward from the pressure-application surface by an amount of 5 to 10 mm.

3. An IC-card manufacturing apparatus according to claim 1, wherein the connection portion comprises a plurality of connections trips which are formed integrally with the plate portion such that the connection strips project from a peripheral edge of the plate portion at predetermined intervals.

4. An IC-card manufacturing apparatus according to claim 3, wherein each connection strip is formed to project in a direction intersecting a direction in which the plate portion deforms.

5. An IC-card manufacturing apparatus according to claim 1, further comprising an evacuation unit for evacuating air from an interior of the laminated-substrate sandwiching unit.

6. An IC-card manufacturing apparatus according to claim 1, wherein the frame portion is heated to a temperature substantially corresponding to an average of a heating temperature and a cooling temperature of the plate portion.

7. An IC-card manufacturing apparatus for manufacturing an IC card from a laminated substrate consisting of an electronic component and resin sheets which sandwich the electronic component, the IC-card manufacturing apparatus comprising:
   a thermocompression-bonding press unit which applies heat and pressure to the laminated substrate from opposite sides thereof by use of a pair of upper and lower press platens which are formed to be identical to each other and having pressure-application surfaces to thereby effect thermocompression bonding; and
   a laminated-substrate sandwiching unit which is independent of a main body of the IC-card manufacturing apparatus and includes upper and lower sandwiching members for sandwiching the laminated substrate in a sealed state,
   at least one air passage which is formed in each of the upper and lower press platens, the at least one air passage having at least one air jetting opening formed on the pressure-application surface of each of the upper and lower press platens;
   an air supply unit for supplying air to the air passage; and
   a control unit for controlling the air supply unit so as to supply air to the air passage for a preset period of time when the paired pressure platens are opened.

8. An IC-card manufacturing apparatus for manufacturing an IC card from a laminated substrate consisting of an electronic component and resin sheets which sandwich the electronic component, the IC-card manufacturing apparatus comprising:
   a thermocompression-bonding press unit which applies heat and pressure to the laminated substrate from opposite sides thereof by use of paired press platens having pressure-application surfaces to thereby effect thermocompression bonding; and
   a laminated-substrate sandwiching unit which is independent of a main body of the IC-card manufacturing apparatus and includes upper and lower sandwiching members for sandwiching the laminated substrate in a sealed state, wherein:
   at least one of the press platens is composed of a press-platen main body having a pressure-application surface and a press-platen base for applying pressure to the press-platen main body;
   a plurality of air cushion units are disposed between the press-platen main body and the press-platen base to be located at different positions; and
   a pressure setting unit for independently setting the respective pressures of the air cushion units in order that the pressure applied over the entire surface of the laminated substrate may vary.

9. An IC-card manufacturing apparatus according to claim 8, wherein the plurality of air cushion units are disposed at four different locations which are symmetric with respect to the center of the pressure-application surface.

10. An IC-card manufacturing apparatus according to claim 8, wherein the pressure setting unit sets the pressures of the respective air cushion units such that the paired pressure-application surfaces become parallel to each other during application of pressure.

11. An IC-card manufacturing apparatus according to claim 8, wherein one of the press platens is a movable press platen which receives pressure from a drive mechanism including a toggle link mechanism.

* * * * *